Patented June 3, 1930

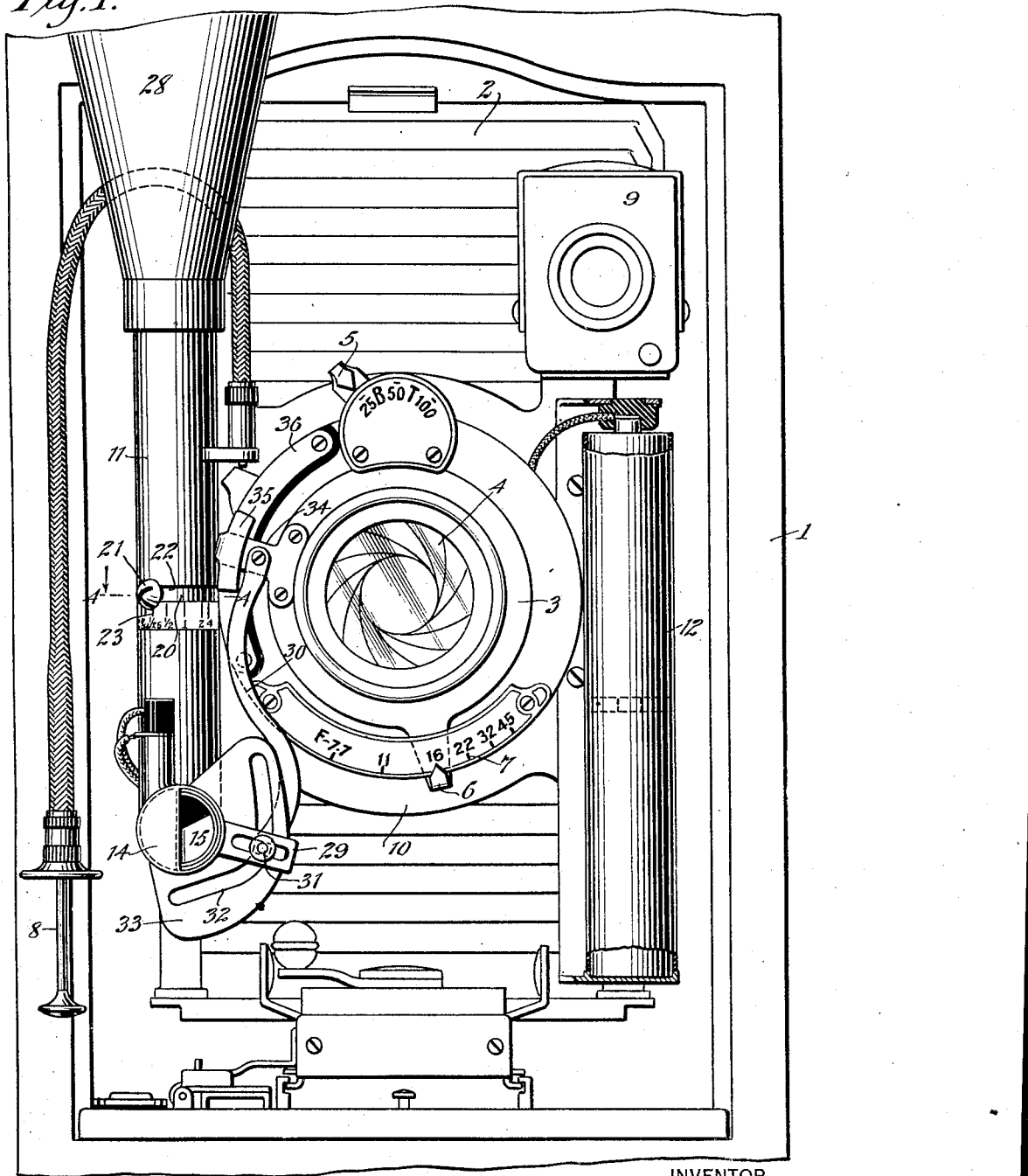

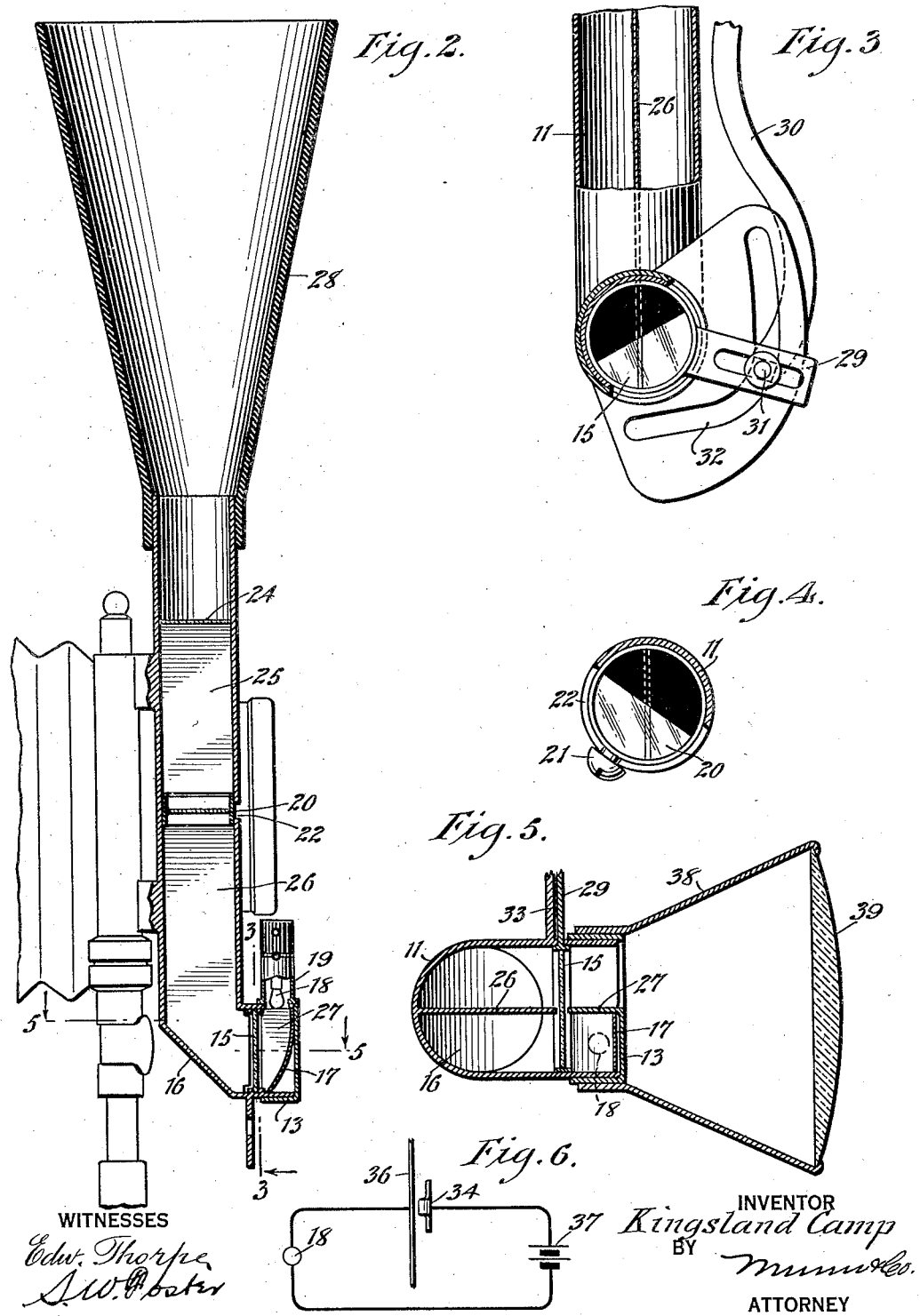

1,762,048

UNITED STATES PATENT OFFICE

KINGSLAND CAMP, OF NEWARK, NEW JERSEY

EXPOSURE CONTROL

Application filed May 26, 1928. Serial No. 280,892.

This invention relates to exposure controls and more specifically to a combined camera and photometer. The operation of the photometer measures light, automatically adjusting the diaphragm of the camera so that the setting of the photometer simultaneously regulates the size of the aperture of the diaphragm of the camera.

My invention also includes a means for finding the proper time of exposure, and this may be operated manually, and it is altogether within the scope of the invention to have said means operatively connected to the camera shutter controlling means for proper timing of the shutter and consequently the proper timing of the exposure.

A further object is to provide a combined photometer and camera, constituting an exposure control, which can be installed on standard types of camera, occupying but small space and interfering in no way with the adjustment, collapse, folding or other operation of the camera. In other words, my invention includes means as part of the camera which enables the operator to accurately measure light and in doing so adjust the diaphragm of the camera and also find the proper time of exposure and adjust the shutter control accordingly so that guess-work in the taking of pictures is practically eliminated.

With these and other objects in view, the invention consists in certain novel features of construction and combinations and arrangements of parts, which will be more fully hereinafter described and pointed out in the claims.

In the accompanying drawings—

Figure 1 is a view in front elevation of a camera equipped with my improved mechanism;

Figure 2 is a view in longitudinal section through the photometer;

Figure 3 is a view in section on the line 3—3 of Figure 2;

Figure 4 is a view in section on the line 4—4 of Figure 1;

Figure 5 is a view in section on the staggered line 5—5 of Figure 2 showing the collecting lens attachment on the photometer;

Figure 6 is a diagrammatic view illustrating a simple form of electric diagram which may be employed in connection with my invention.

1 represents the box or casing of a camera, 2 the adjustable bellows, 3 the movable ring controlling the operation of the diaphragm 4, and 5 a movable pointer to control the time of the exposure through the medium of the operation of a standard type of shutter.

The ring also has a pointer 6 which registers with a scale 7 on the camera to indicate the size of the opening in the diaphragm 4. 8 is a shutter controlling plunger and 9 a finder. All of the parts above described constitute a standard type of camera, and I have chosen this type of camera for purposes of illustration but it is obvious that my invention might be employed with many different types of camera, including motion picture cameras, and I do not wish to be limited in this respect.

Cameras of the type described are provided with a frame 10 which is moved inwardly and outwardly to expand or contract the bellows 2, and to this frame at one side of the camera I secure my improved photometer 11, and on the opposite side I secure a battery casing 12, both of which are of such size as to enable the camera to be folded or collapsed within the box or casing 1.

Referring more particularly to my improved photometer, it will be noted that the photometer comprises a cylindrical, vertically disposed barrel having a light inlet lower end which is disposed at right angles to the vertical barrel 11. This light receiving end may constitute a cap 13 which is removable, or permanently secured in the end of the barrel, and is of circular or cylindrical form having a semicircular opening therein and a semicircular closed portion 14.

Back of the light inlet end or cap 13 I locate a discriminating disk 15 which has a turning movement and which is of circular form having one-half thereof clear and one-half opaque. The photometer at its lower end and in the rear of the disk 15 has an inclined wall 16 having a dull surface which deflects the light upwardly through the barrel.

In front of the disk 15 a reflector 17 is provided in that half of the light inlet end which is closed so that the light rays from an electric bulb 18 in a casing 19 is directed through the clear portion of the disk 15 by the reflector 17.

Intermediate the ends of the barrel 11 I provide a second discriminating disk 20 which has partial turning movement and which is half clear and half opaque, and I have shown a headed screw 21 movable in a slot 22 in barrel 11 as a means for manual manipulation of this disk 20 with a scale 23 provided on the outside of the barrel 11 with which the head of the screw registers to indicate time exposures. This disk 20 diffuses as well as discriminates and if clear some means adjacent the disk must be employed to diffuse the light.

In the upper portion of the barrel 11 I provide a light diffusing disk 24 which may be of any suitable translucent material. The barrel or casing of the photometer is divided into two halves from the disk 24 to the light receiving lower end, and in order to thus divide the barrel it is necessary to provide a vertical partition 25 between the screen 24 and the disk 20, a second vertical partition 26 between the disk 20 and the disk 15 and a third portition 27 between the disk 15 and the end of the cap 13, it being understood that the reflector 17 is in the closed portion only of the cap.

On the upper end of the casing or barrel 11 I provide a flexible, preferably removable, collapsible or movable, funnel-shaped member 28 through which the operator looks to observe the light conditions within the photometer.

The photometer operates on the following principle: The light from the electric bulb 18 is of known quality and the brilliance of the outside light is unknown but must be considered in order to give the proper diaphragm adjustment and for the proper time exposure. By the illumination from the electric bulb 18 the difference is confined to one-half or one side of the photometer by reason of the partitions 25, 26 and 27, as above set forth, and the light rays from the outside are separated from the light rays of the electric bulb by reason of the same partitions.

The operator first turns disk 20 to the desired exposure, then moves controller 35 to such point that diffusion disk 24 is evenly illuminated; this automatically sets the diaphragm at the correct opening; and if equal illumination cannot be reached, it shows that the time of exposure chosen is impossible under the given lighting conditions for the camera. In that case either a longer exposure must be chosen, or the picture is not practicable to take.

This variance in light in the two halves of the photometer is of course due to the movement of the opaque portion of the discriminating disk, and while I refer to these parts as disks having portions opaque and portions clear it is perfectly obvious that they may be otherwise constructed in order to give the same results and I do not wish to be limited to this choice of expression.

The movement of the discriminating disk 15 is mechanically connected with the diaphragm controlling ring 3, as will now be explained, so that the movements of these parts are simultaneous and the diaphragm is automatically adjusted in accordance with the adjustment of the discriminating disk 15.

A slotted crank arm 29 is fixed to move with the discriminating disk 15 and is pivotally connected to the lower end of the link 30, the upper end of said link being pivotally connected to a spring tongue 34 fixed to the diaphragm ring 3, and the lower end of the link is connected by a pivot pin 31 with the crank arm 29, and the pin 31 is movable in a cam slot 32 in a plate 33 fixed to the lower end of the photometer.

A fingerpiece 35 is connected to the spring tongue 34 and is adapted to receive the thumb or finger of the operator to simultaneously manipulate the discriminating disk 15 and the camera diaphragm. The spring tongue 34 acts also as an electric contact normally spaced from a curved contact strip 36 which is insulated from the camera, as shown.

The casing 12 above referred to supports any desired number of batteries, one terminal thereof being grounded through the metal of the camera and the other terminal connected to the contact strip 36 including the electric bulb 18 in circuit. This circuit is normally open so that there is no drain on the batteries except when adjusting the diaphragm and discriminating disk 15. During this operation the finger piece 35 is pushed inwardly as well as moved up and down so that the electric circuit is closed to illuminate the electric lamp 18 during the operation of the photometer. At other times the circuit is open.

In Figure 6 I illustrate a simple form of electric diagram, which indicates the aperture above explained, and in this diagram the battery is indicated by the reference character 37, one side of the battery being connected to the spring tongue 34, the other side of the battery connected to the contact plate 36 and including in circuit the electric bulb 18.

Where it is desired to concentrate or secure a portion of a scene with greater accuracy than other portions of the scene I may utilize an attachment 38, such as shown in Figure 5, which comprises a conical hood adapted to fit over the cap 13 and carries a lens 39 at its outer end.

While I have illustrated what I believe to be a preferred embodiment of my invention it is obvious various changes and alterations might be made in the general form of the parts described without departing from my invention and hence I do not limit myself to the precise details set forth but consider myself at liberty to make such changes and alterations as fairly fall within the spirit and scope of the appended claims.

I claim:

1. An exposure control for a camera, including a photometer, an electric lamp in the photometer, a battery, and shutter operating means operatively connected to the photometer and constituting a circuit closer for the lamp.

2. An exposure control for cameras, including a photometer, an electric lamp in the photometer, a battery, a shutter operating means controlling the operation of the photometer and the closing of the circuit to the lamp, and means supporting said photometer and battery on the camera.

3. A photometer attachment for cameras, including a barrel, longitudinal partitions dividing the barrel into two halves, said barrel having a light inlet end at right angles to the main portion of the barrel, half of said inlet end being closed, a discriminating disk having turning movement adjacent the light inlet end of the barrel, a dull deflector at the angle of the barrel adapted to deflect the rays of light upwardly through the barrel, a reflector in the closed porton of the inlet end of the photometer, an electric lamp directing its rays against said reflector, and a diffusing screen in the upper portion of the photometer.

4. A photometer attachment for cameras, including a barrel, longitudinal partitions dividing the barrel into two halves, said barrel having a light inlet end at right angles to the main portion of the barrel, one-half of said inlet end being closed, a discriminating disk having turning movement adjacent the light inlet end of the barrel, a dull deflector at the angle of the barrel adapted to deflect the rays of light upwardly through the barrel, a reflector in the closed portion of the inlet end of the photometer, an electric lamp directing its rays against said reflector, a diffusing screen in the upper portion of the photometer, and a second discriminating disk located intermediate the ends of the photometer casing of the camera.

5. A photometer attachment for cameras, including a barrel, longitudinal partitions dividing the barrel into two halves, said barrel having a light inlet end at right angles to the main portion of the barrel, one-half of said inlet end being closed, a discriminating disk having turning movement adjacent the light inlet end of the barrel, a dull deflector at the angle of the barrel adapted to deflect the rays of light upwardly through the barrel, a reflector in the closed portion of the inlet end of the photometer, an electric lamp directing its rays against said reflector, a diffusing screen in the upper portion of the photometer, and a flexible conical sighting device on the upper end of the barrel.

6. The combination with a camera, of a photometer attached to the camera, an electric lamp in the photometer included in circuit with a battery constituting a part of the camera and photometer assemblage, means in the photometer for controlling the admission of natural light for comparison with the light of the lamp, said last mentioned means operatively connected to the shutter of the camera and operating a circuit closer between the battery and the lamp whereby the circuit is closed only when the operting means of the photometer is moved from normal position.

Signed at New York, in the county of New York and State of New York, this 24th day of May A. D. 1928.

KINGSLAND CAMP.